(12) United States Patent
Birkelbach et al.

(10) Patent No.: US 7,188,057 B2
(45) Date of Patent: Mar. 6, 2007

(54) SYSTEMS AND METHODS FOR DESIGNING, SIMULATING AND ANALYZING TRANSPORTATION SYSTEMS

(75) Inventors: Ronald L. Birkelbach, Pittsburgh, PA (US); Daniela Birkelbach, Pittsburgh, PA (US)

(73) Assignee: Kennebec, Inc., Bethel Park, PA (US)

( * ) Notice: Subject to any disclaimer, the term of this patent is extended or adjusted under 35 U.S.C. 154(b) by 536 days.

(21) Appl. No.: 10/634,985

(22) Filed: Aug. 4, 2003

(65) Prior Publication Data
US 2004/0059442 A1  Mar. 25, 2004

Related U.S. Application Data

(60) Provisional application No. 60/400,577, filed on Aug. 2, 2002.

(51) Int. Cl.
*G06G 7/48* (2006.01)
(52) U.S. Cl. ............................................. 703/7; 701/19
(58) Field of Classification Search .................... 703/7; 701/19, 20, 117; 434/62
See application file for complete search history.

(56) References Cited

U.S. PATENT DOCUMENTS

| | | | | |
|---|---|---|---|---|
| 5,456,604 A | * | 10/1995 | Olmsted et al. | 434/62 |
| 5,794,172 A | * | 8/1998 | Matheson et al. | 701/117 |
| 5,810,596 A | * | 9/1998 | Van Lookeren Campagne | 434/62 |
| 5,951,018 A | * | 9/1999 | Mamitsu | 273/442 |
| 6,261,100 B1 | * | 7/2001 | Bragdon | 434/29 |

* cited by examiner

*Primary Examiner*—Albert W. Paladini
(74) *Attorney, Agent, or Firm*—Reed Smith LLP

(57) ABSTRACT

A computer system for designing rail systems including a database engine, a simulation engine, and a 3-dimensional graphics engine. A user stores attributes for a proposed transit system such as track segment data, signaling and switching data, and train configuration data into the database engine. The simulation engine accesses and processes this data to simulate various aspects of the system. During simulation or separately, a 3-dimensional graphics engine accesses and processes this same data from the database engine to visually present a user with a real-time, 3-dimensional rendering of the proposed rail system in use. The computer system may also include a reports engine for reporting to the user information related to the proposed rail system or simulation.

20 Claims, 10 Drawing Sheets

| | | | | | | | | | |
|---|---|---|---|---|---|---|---|---|---|
| View Log | | | | | | | | | |
| Log Filename | | Log Type | | All Trains | | Train | | | Close |
| May03_155v47.log | | ALL | | | | | | Stop | |

| | | | | | | | | | |
|---|---|---|---|---|---|---|---|---|---|
| 00:04:52 | SB | Moving | | | LN | | 178212.01 | LN | 178296.01 | 0.05 | 0.30 | 35 |
| 00:04:53 | SB | Moving | | | LN | | 178212.00 | LN | 178296.00 | 0.01 | 0.30 | 35 |
| 00:04:53 | SB | ARRIVE | Honi_S | Honi | LN | | 178212.00 | LN | 178296.00 | 0.00 | 0.00 | 35 |
| 00:04:54 | SB | Dwelling | | | LN | | 178212.00 | LN | 178296.00 | 0.00 | 0.00 | 35 |
| 00:04:54 | SB | Dwelling | | | LN | | 178212.00 | LN | 178296.00 | 0.00 | 0.00 | 35 |
| 00:04:55 | SB | Dwelling | | | LN | | 178212.00 | LN | 178296.00 | 0.00 | 0.00 | 35 |
| 00:04:55 | SB | Dwelling | | | LN | | 178212.00 | LN | 178296.00 | 0.00 | 0.00 | 35 |
| 00:04:56 | SB | Dwelling | | | LN | | 178212.00 | LN | 178296.00 | 0.00 | 0.00 | 35 |
| 00:04:56 | SB | Dwelling | | | LN | | 178212.00 | LN | 178296.00 | 0.00 | 0.00 | 35 |
| 00:04:57 | SB | Dwelling | | | LN | | 178212.00 | LN | 178296.00 | 0.00 | 0.00 | 35 |
| 00:04:57 | SB | Dwelling | | | LN | | 178212.00 | LN | 178296.00 | 0.00 | 0.00 | 35 |
| 00:04:58 | SB | Dwelling | | | LN | | 178212.00 | LN | 178296.00 | 0.00 | 0.00 | 35 |
| 00:04:58 | SB | Dwelling | | | LN | | 178212.00 | LN | 178296.00 | 0.00 | 0.00 | 35 |
| 00:04:59 | SB | Dwelling | | | LN | | 178212.00 | LN | 178296.00 | 0.00 | 0.00 | 35 |
| 00:04:59 | SB | Dwelling | | | LN | | 178212.00 | LN | 178296.00 | 0.00 | 0.00 | 35 |
| 00:05:00 | SB | Dwelling | | | LN | | 178212.00 | LN | 178296.00 | 0.00 | 0.00 | 35 |
| 00:05:01 | SB | Dwelling | | | LN | | 178212.00 | LN | 178296.00 | 0.00 | 0.00 | 35 |
| 00:05:02 | SB | Dwelling | | | LN | | 178212.00 | LN | 178296.00 | 0.00 | 0.00 | 35 |
| 00:05:03 | SB | Dwelling | | | LN | | 178212.00 | LN | 178296.00 | 0.00 | 0.00 | 35 |
| 00:05:04 | SB | Dwelling | | | LN | | 178212.00 | LN | 178296.00 | 0.00 | 0.00 | 35 |
| 00:05:05 | SB | ROUTE REQ | 4S_3212T | | | | | | | | | |
| 00:05:05 | SB | ROUTE REQ | 1BT | Honi | | | | | | | | |
| 00:05:05 | SB | ROUTE REQ | HAMS1 | Honi | | | | | | | | |
| 00:05:05 | SB | ROUTE REQ | 3212T | Cass | | | | | | | | |
| 00:05:05 | SB | Dwelling | | | LN | | 178212.00 | LN | 178296.00 | 0.00 | 0.00 | 35 |
| 00:05:06 | SB | Dwelling | | | LN | | 178212.00 | LN | 178296.00 | 0.00 | 0.00 | 35 |
| 00:05:06 | SB | Dwelling | | | LN | | 178212.00 | LN | 178296.00 | 0.00 | 0.00 | 35 |
| 00:05:07 | SB | Dwelling | | | LN | | 178212.00 | LN | 178296.00 | 0.00 | 0.00 | 35 |
| 00:05:07 | SB | Dwelling | | | LN | | 178212.00 | LN | 178296.00 | 0.00 | 0.00 | 35 |
| 00:05:08 | SB | Dwelling | | | LN | | 178212.00 | LN | 178296.00 | 0.00 | 0.00 | 35 |
| 00:05:08 | SB | Dwelling | | | LN | | 178212.00 | LN | 178296.00 | 0.00 | 0.00 | 35 |
| 00:05:09 | SB | Dwelling | | | LN | | 178212.00 | LN | 178296.00 | 0.00 | 0.00 | 35 |
| 00:05:09 | SB | Dwelling | | | LN | | 178212.00 | LN | 178296.00 | 0.00 | 0.00 | 35 |
| 00:05:10 | SB | ROUTE SET | 4S_3212T | | | | | | | | | |
| 00:05:10 | SB | ROUTE SET | 1BT | Honi | | | | | | | | |
| 00:05:10 | SB | ROUTE SET | HAMS1 | Honi | | | | | | | | |
| 00:05:10 | SB | ROUTE SET | 3212T | Cass | | | | | | | | |
| 00:05:11 | SB | Dwelling | | | LN | | 178212.00 | LN | 178296.00 | 0.00 | 0.00 | 35 |
| 00:05:11 | SB | Dwelling | | | LN | | 178212.00 | LN | 178296.00 | 0.00 | 0.00 | 35 |
| 00:05:12 | SB | Dwelling | | | LN | | 178212.00 | LN | 178296.00 | 0.00 | 0.00 | 35 |
| 00:05:12 | SB | PROCEED | 4S | Honi | | | | | | | | |
| 00:05:13 | SB | DEPART | Honi_S | Honi | LN | | 178211.95 | LN | 178295.95 | 0.14 | 0.30 | 35 |
| 00:05:13 | SB | Moving | | | LN | | 178211.78 | LN | 178295.78 | 0.30 | 0.30 | 35 |
| 00:05:14 | SB | Moving | | | LN | | 178211.49 | LN | 178295.49 | 0.46 | 0.30 | 35 |

Figure 10

| Calculate Passenger Flow | From | To | | Passenger Flow | | | |
|---|---|---|---|---|---|---|---|
| ARRIVALS | 9:01 | 9:00 | | | | | |
| Vehicle Capacity | 184 | | | | | | |
| SB Arrivals | 6 | | | 1104 | | | |
| NB Arrivals | 6 | | | 1104 | | | |
| SB Departures | 0 | | | 0 | | | |
| NB Departures | 0 | | | 0 | | | |

KENNEBEC
BAHN DIMENSION

SYSTEMS AND METHODS FOR DESIGNING, SIMULATING AND ANALYZING TRANSPORTATION SYSTEMS

CLAIM OF PRIORITY

This application claims priority to U.S. Provisional Patent Application Ser. No. 60/400,577 filed on Aug. 2, 2002.

BACKGROUND OF THE INVENTION

1. Field of the Invention

The present invention relates generally to systems and methods for designing, simulating and analyzing transportation systems and, more specifically, to a computer software implementation of an integrated system for all facets of rail system design.

2. Description of the Background

Rail systems (e.g., heavy rail, light rail, transit and people movers) have long been a convenient and relatively inexpensive method for transporting people and cargo from one predefined location to another. By interconnecting various rail lines, for example using track switches and rail yards, many diverse locations can be interconnected. In recent years, some of these systems, such as people movers at airports, have been largely automated in operation.

A unifying characteristic of these systems, however, is the use of a track or other medium on which the train cars travel. Because these tracks are expensive and often take a great deal of time to install, much effort is typically involved in determining the best location in which to lay the track and in designing the specifics of the track layout. Further, the scheduling and other operational characteristics of the trains themselves involve a similar, large-scale effort.

In order to reduce mistake-laden or less than optimal track configurations from being employed, necessitating a subsequent modification, systems have been developed to aid in the design and layout of rail system track configurations before the track is actually laid. Some of these systems utilize some type of computer operation to speed the necessary calculations.

Further, some computer systems currently exist to graphically model or "simulate" the movement of a train or other features of a rail system. Typically, such systems have minimal design and graphics options.

As such, there is a need in rail system design for systems and methods that unify the various design and simulation stages of rail layout configuration and design. Specifically, there is a need to unify the fundamental track configuration with useful design, performance testing, and training tools such as real-time 3-dimensional ("3-D") modeling, simulation algorithms, report generation for future analysis, performance calculations (such as people throughput), alarm notification to indicate improper occurrences, and the like. The present invention, in at least one preferred embodiment, addresses these and other limitations of the prior art rail system design tools.

SUMMARY OF THE INVENTION

In accordance with at least one preferred embodiment, the present invention provides an integrated suite of software tools for rail system design including a database storing fundamental track, train and scheduling information related to a proposed rail system. This database is communicatively coupled with a simulation engine for creating virtual tests of the rail system under various environmental conditions and a graphics engine for rendering, in real-time, a 3-dimensional visual version of the simulated system to enhance user functionality.

The simulation engine shows how a system will execute with the parameters provided by users. It is intended to provide a simulated rail system displaying track, trains, stations, wayside devices and topography of the transit system. Various alternative simulations may be used to train engineers, controllers and other people associated with the rail system using this virtual rail system.

The graphics are preferably rendered in 3-dimensional mode, which emulates the actual experience of observing how trains and wayside equipment behave during operation. Multiple "camera" views (both stationary and following along with the train) are available to the user to assess different facets of the track layout. Objects, such as signals, stations and other wayside objects within the graphics may be placed on the screen by the user. Track is automatically placed according to parameters set up during the design stage. The entire system is preferably displayed to scale.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 7 shows an exemplary database engine data entry screen for grade crossing data;

FIG. 9 shows an exemplary simulation engine event log screen; and

FIG. 10 shows an exemplary performance report created by the reports engine.

DETAILED DESCRIPTION OF THE INVENTION

Figure 1:
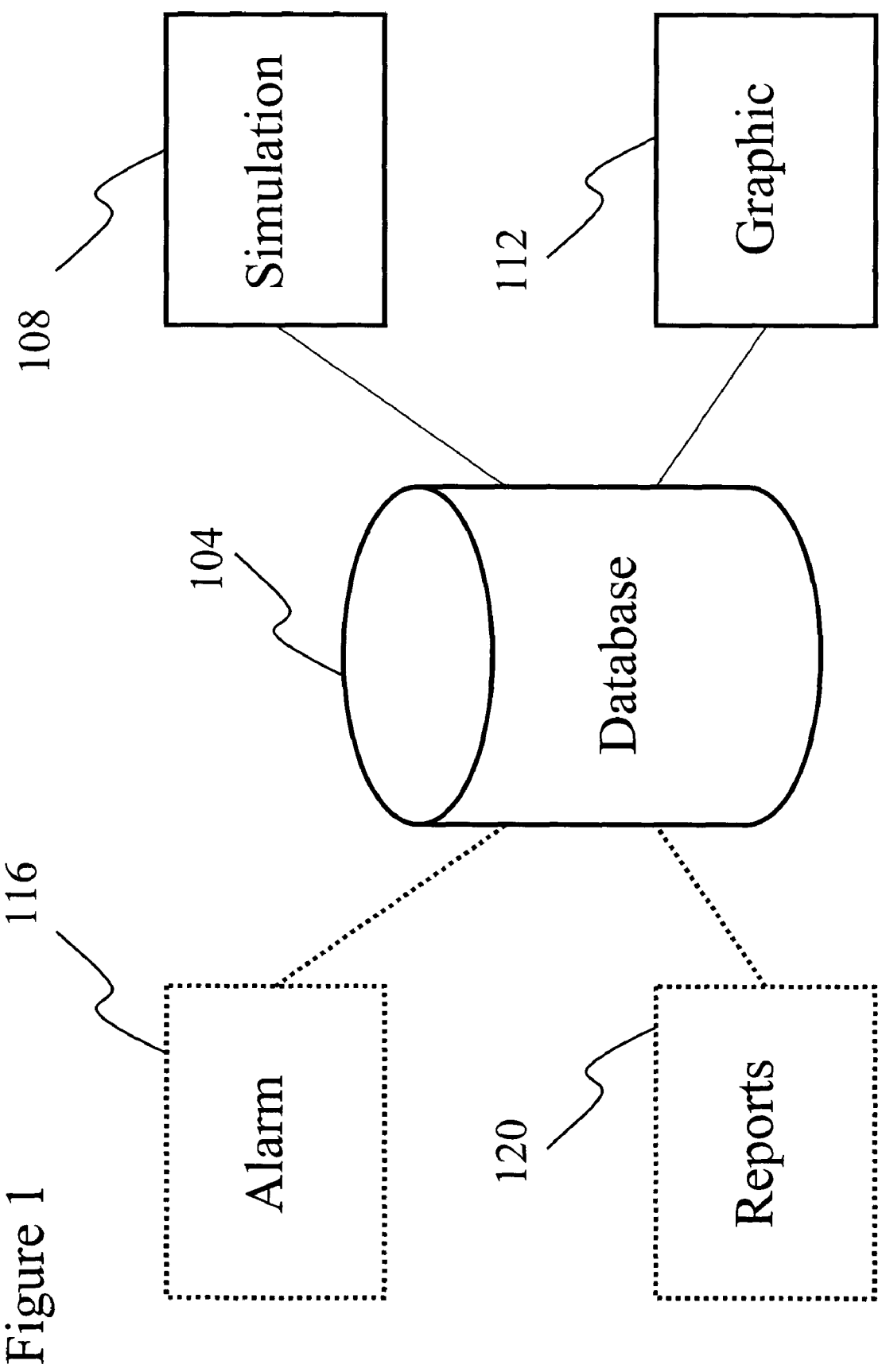
FIG. 1 is a high level block diagram of exemplary system components.

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable in some implementations of the present invention. However, because such elements are well known in the art, and because they do not facilitate a better understanding of the present invention, a discussion of such elements is not provided herein. The detailed description will be provided hereinbelow with reference to the attached drawings.

Generally speaking, the present invention is directed to a computer system used to assist in the design, layout, simulation, training, testing and control of transit systems. While large portions of this specification are devoted to a discussion of rail systems, it is to be understood that the present invention is useful with and applicable to transit systems generally, including, but not limited to rail systems and bus systems. In particular, the present invention is useful with heavy rail, light rail, transit and automatic people mover systems (collectively referred to herein as "rail systems"). Initially, a user enters configuration information related to a rail system into a database according to designer specifications. After valid track data is entered into the database, the present invention provides users with a suite of software applications that may be used to further modify and test the rail system.

These additional applications provide functionality that is useful for many different aspects of a typical business. For example, the system preferably includes the following functionality: a marketing/modeling application; a performance simulator; a central office dispatcher training simulator; and a central office test simulator.

Although previous design and simulation systems have incorporated one or a few of these various tasks, the present invention coordinates each by utilizing the same database for the operation of each subsystem. If data requires modification for one of the above systems, a change to the common database modifies the data for each of the systems. In addition, the present invention allows for design and testing of train movement, standard ATO (Automatic Train Operation) and ATP (Automatic Train Protection) functionalities, in which these systems are completely configurable by the user. This high degree of flexibility provides the present system with extensive applicability across a variety of transportation systems, including rail systems and bus systems. Each of these additional functionalities will now be described in brief.

For marketing and modeling purposes, the present invention graphically displays the look and feel of a proposed rail system using a 3-dimensional graphics display. The software displays the system layout (e.g., tracks, track circuits, switches, stations, etc.) as well as topography such as grades and curves. Based on generic routing algorithms, the system can graphically depict the movement of trains around the system in relation to the surrounding environment. In this way, less than optimal track and train configurations that "appear" to be satisfactory based on a paper track layout can be corrected at an early stage in the design process. The resulting output from a simulation run can be used for operations and maintenance planning as well as determine alternative solutions to meet requirements imposed on a supplier. Further, non-technical individuals can be shown the train system operation and layout as it will appear in practice. This feature can be enhanced by adding custom-designed buildings, road, foliage, people, signs objects and surrounding landmarks.

As a performance simulator, the present computer system is capable of calculating performance parameters such as schedules, passenger load, train throughput and performance-limiting alarm conditions—all based on the single data set from the same database. In addition, the system includes algorithms based on a configurable signaling system, device timing and user parameters that will calculate maximum efficiency for train movement. This portion of the present invention, therefore, is useful for determining if a design satisfies performance criteria, as well as aiding in the modification of a design that is less than optimal. A replay function allows the user to view an existing simulation by reading the log file and replaying it through the simulation engine.

As a central office dispatcher training simulator, the present invention allows a user to interact with the real-time graphics to change the states of various devices and trains on the system. This portion of the application allows users to understand how to operate and dispatch trains from the central office and is a useful aid in preparing for potentially dangerous situations. Again, this functionality is fully integrated into the common database of track layout(s) coupled with 3-D displays to provide a view of what occurs on the actual system.

As a central office testing system, the present invention allows designers, developers and testers of central office control systems to transmit and receive messages to a "virtual field site" prior to installation of track, signals and other wayside devices. Furthermore, functions such as routing algorithms, alternative route determination, train tracking, alarm functions and testing of individual wayside devices (i.e., point-to-point testing) can be designed and tested prior to installation. Subsystem testing, factory acceptance testing and customer witness tests can be performed by employing the present invention. The present invention also preferably includes a configuration module whereby the user can configure all incoming/outgoing messages to and from the invention such that any message or device state can be passed between the two systems.

General Hardware and Software Overview

In order to provide the varied functionality described above, the present invention includes a series of software engines run on one or more linked computers. The three main subsystems, as depicted in FIG. 1, include: (1) a database engine 104; (2) a simulation engine 108; and (3) a graphics engine 112. These software and hardware engines may also incorporate alarm 116 and reporting 120 functionality in these or additional software engines (FIG. 1).

The database engine 104 stores the basic track configuration information which logically represents the proposed rail system to be modeled. The simulation engine 108 stores and processes data related to simulated "trials" of the rail system in motion, and the graphics engine 112 uses the data in the database to visually depict the look-and-feel of the rail system to a user in motion.

Figure 2:
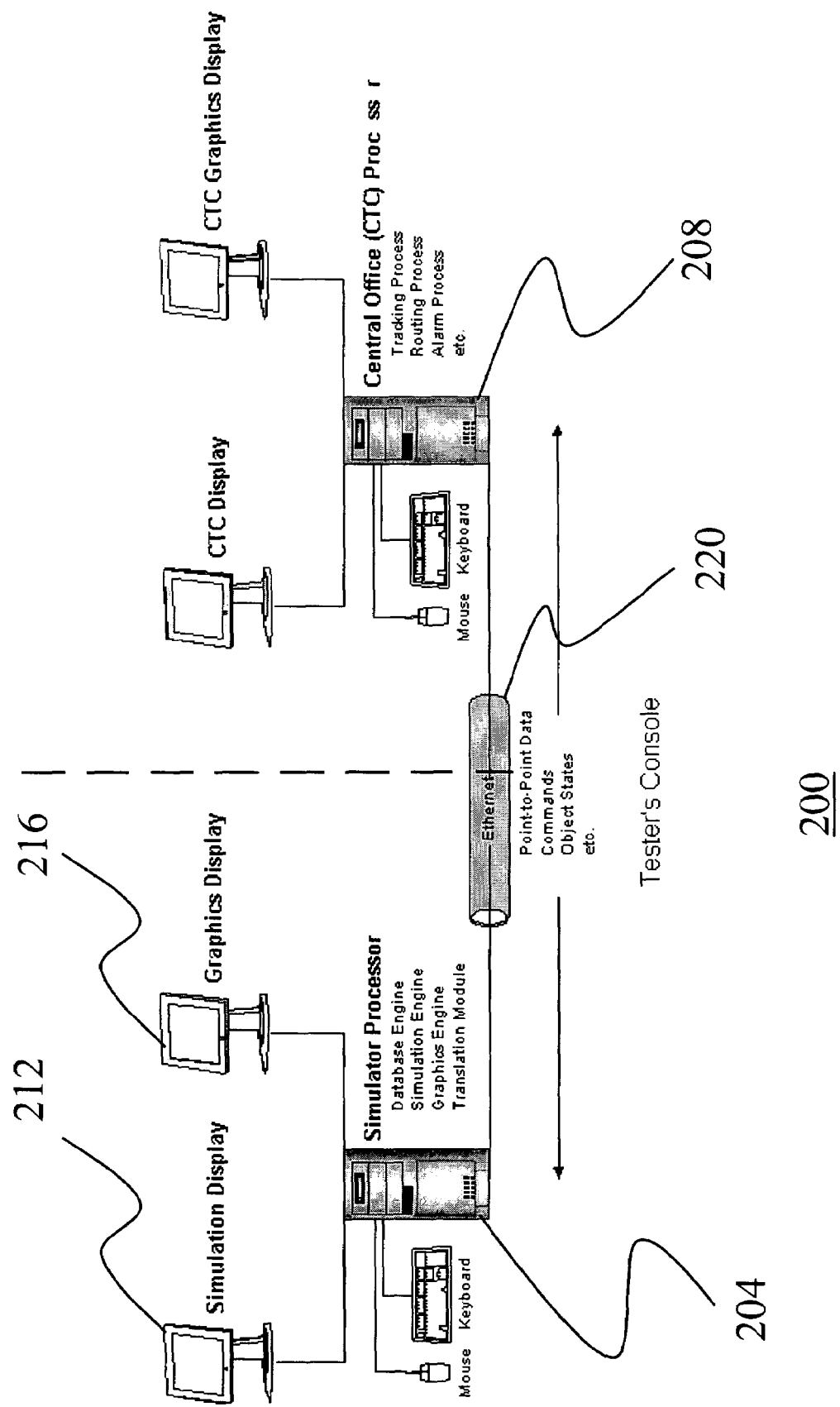
FIG. 2 is a block diagram of exemplary hardware used as part of the rail system of the present invention.

FIG. 2 is a block diagram of a typical system configuration for the present invention 200. Generally, the software system may be run as a standalone system maintaining its own internal logic and data resources. In this case, the system includes one or more databases connected to one or more personal computers, servers, workstations or other data input/output sources used to access the database. Further, one or more display devices 212 216 are used to graphically display the 3-dimensional rendering of the rail system. The various components may be directly connected via a computer bus (in one or more housings) or the various components may be interconnected by any wired or wireless communications scheme (for example, through an Ethernet-based connection 220 utilizing TCP/IP with UDP protocols). The embodiment shown in FIG. 2 is particularly adapted to act as a central testing system. In this particular implementation, a first personal computer 204 houses and operates the databases and software required to generate the simulation content. A trainer may use this computer to adjust the simulation conditions for the trainee. The trainee employs a second personal computer 208 to interact with the first personal computer and to guide the simulation. The computers may be connected by a standard Ethernet connection 220.

The use and functionality of the present design and simulation system is described in detail below. For clarity, the system is described with respect to four main executable software programs (database, simulation, graphics and report), but any combination or alternative configuration is contemplated within the scope of the present invention. In other words, this same functionality could be implemented in a greater or fewer number of programs in an almost limitless number of configurations.

Database Engine

The database engine is at the core of the present system. The database functions provide users with the ability to design the rail layout and other parameters of a rail-based transit system. A standalone application allows users to create data files whereby the topography is created. In essence, the user takes the plans and specifications for a proposed railway design system, and logically represents the track configuration and topography in the database. The database engine, therefore, includes the database structures and rules as well as user-friendly applications for entry and modification of database information. Because all of the simulation and analytical tools use the data from this common database, the data need only be manipulated once—in this database.

In a fixed-block simulation, a "track circuit" is the fundamental unit of track in the rail system database. A series of track circuits can be combined together to make a track line (the next largest logical track grouping). The total track layout consists of a series of track lines (groups of track circuits) that are logically connected to each other (e.g., through switches) in the database engine.

In a communications-based train control (i.e., CBTC) simulation, track circuits preferably do not exist. Instead of track circuits and wayside signals, train separation is determined by braking distance to other objects (e.g., switches and other trains) and not by block occupancy. For configuration purposes, virtual signals may be placed within the database for control. This also allows the system to operate according to any CBTC system installed by any signaling vendor. Other functions are similar in operation as fixed-block simulations.

In the database, each track line in a rail layout is designated with a unique track line identifier (ID). The configuration parameters for each track line in the database includes a beginning (Start of Line—SOL) and an ending location (End of Line—EOL). The start and end locations typically exist at the entrance to a yard, the end of a line of track or at a connection point to another track line through a switch.

There are two directions of travel defined for trains that run on track layouts in the database: increasing and decreasing. Civil locations (the actual, physical locations of track segments for a proposed rail layout on a map) are provided by transit authorities and railroads and are used to define the locations of switches, track circuits, signals and stations. Track lines (series of track segments) are defined in the database in the direction of travel. This direction is designated as the "increasing" direction of travel for increasing civil locations and "decreasing" direction of travel for decreasing civil locations. The start of the track line is always defined at the end with the lowest civil location, and the end of the track line is defined at the end with the highest civil location.

As mentioned above, track lines are made up of one or more track circuits—the fundamental unit of track in the database. Each track circuit is defined as a self-contained segment of track whereby an occupancy within that segment by any part of a train constitutes an entire occupancy of that segment. In the database, each track circuit is defined by a unique track circuit ID, the start and end locations of the track circuit, the adjacent track circuits, the track circuit type, the ID number for the line on which the track circuit is located and/or the speed limit for that particular track circuit, among other characteristics.

Figure 3:
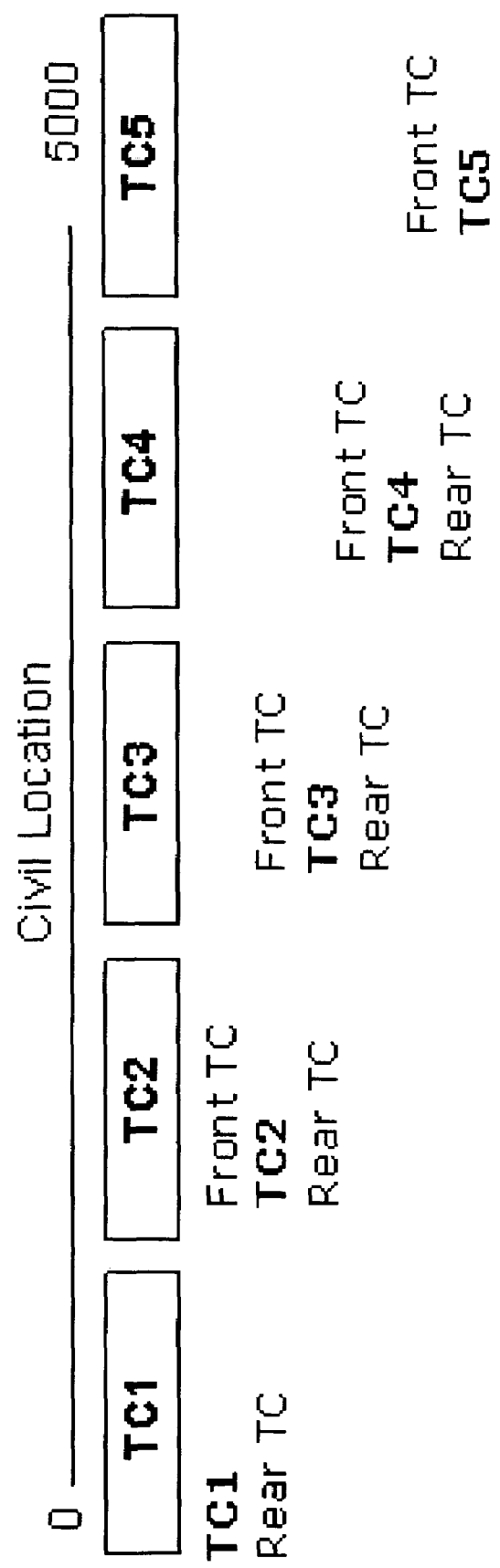
FIG. 3 details an exemplary configuration for a series of five track circuits in a track line.

FIG. 3 details an exemplary configuration for a series of five track circuits (TCs) in a track line, based on the civil location scale at the top of the figure. For example, track circuit number three is labeled TC3. The track circuits that are adjacent to TC3 are defined as either "front" or "rear" track circuits (Front TC or Rear TC) of TC3 based on the civil location. The front track circuit is the track circuit that is adjacent to the track circuit in the increasing civil location direction. Likewise, the rear track circuit is adjacent to the track circuit in the decreasing civil location. If the track circuit is adjacent to a switch (the start or end of the track line), the front or rear track circuit may be dynamically defined based on the position of the switch.

The table in FIG. 3 indicates how the adjacent track circuits are configured based on the civil location at the top of the figure. For example, TC3's Rear TC would be TC2, and its Front TC would be TC4. The Front TC for TC5 would be null while the Rear TC for TC1 would also be null.

As briefly mentioned above, track lines are defined as having a beginning (lowest civil) and an end (highest civil) location; therefore, trains that travel in the direction from start to end are said to be traveling in the increasing direction of travel. Travel in the opposite direction is said to be traveling in the decreasing direction of traffic.

In addition to this location-based information, a track circuit may also be defined in the database engine as being of one or more different "types"—which will affect how the trains travel over these track circuits in simulation mode. These track types are not mutually exclusive, and any track circuit may be defined as a combination of various types of track. The major types of track circuits include: yard; block; station; platform; switch; and route trigger, as examples.

"Yard" track circuits are track circuits that are located within a yard. These track circuits do not have any routing associated with them. All train movement on yard track circuits is manual with signal and switch manipulation by the user.

"Block" track circuits are those that are not located within the confines of a station interlocking. Block track circuits may or may not have routes associated with them; however, a block track circuit may be either a route trigger or the end track circuit within a route. Train movement within block track circuits may be controlled by automatic block signals.

"Station" track circuits are located within station interlockings. They are either controlled by routes or by shunt (station) signals. Station track circuits may or may not have signals controlling train movement within them.

"Platform" track circuits are located within station interlockings. They indicate the location at which the lead vehicle in a consist (train of cars) must stop at a station. Platform track circuits are typically at the end of a station's approach route.

A track circuit is designated as a "Switch" Track Circuit (STC) if it is connected to a switch. STCs are decision points for train direction when exiting a switch.

A track circuit is designated as a "Route Trigger" if it triggers a route request for a train that enters it. A delay, expressed in seconds, may be associated with the occupancy of the route trigger track circuit such that a route is not requested until the delay time has expired. Route triggers are specific to train direction and route and are not associated with more than one route in a given direction.

In addition to the physical track layout, rail systems also typically include a variety of different signals and signal functionality. For example, there are crossing signals where rails and roads intersect. There are also various signals associated with changes in speed limits, entrance and egress from stations and platforms, and other warning indicators.

The database engine of the present invention, therefore, also includes a customizable group of signals that may be implemented in order to enhance the features and functionality of the system. Signals are generally located at the end points of track circuits and determine if a train may enter the track circuit based on occupancies (other trains already on or near the requested track circuit). Signal configuration may be represented in the database engine as comprised of a signal ID, signal location, the track circuit that the signal protects and the type of signal.

Most prior art simulation systems that include signaling functionality are based on a predefined set of signaling rules for a specific geographic location. For example, a software package may be based on the signaling rules defined by NORAC for rail lines in the northeastern United States. While the present invention is capable of including such predefined signaling schemes, it preferably includes completely configurable signaling rules that can be set by the user. This flexibility allows the system to be useful for unique jobs or in uncommon locations which have no commonly defined standard. Prior systems would need to "estimate" signaling rules for these locations by selecting the closest stored signaling scheme.

As an example, there may be five distinct types of automatic signals for use in the database engine: (1) approach; (2) home; (3) yard; and (4) block.

Approach signals are located at the approach to other signals. They define the beginning of approach routes and must be set to a state other than stop in order to set an approach route. Home signals are found at interlocking conflict points and determine if a train can enter an interlocking.

Yard signals are located within the yard and maintenance areas. Yard signals are not associated with routes and are set manually by the user. Block signals are located along stretches of block track circuits. They control traffic into block track circuits outside the bounds of interlockings with predefined rules for traffic. Block signals are not typically associated with routing.

Figure 4:
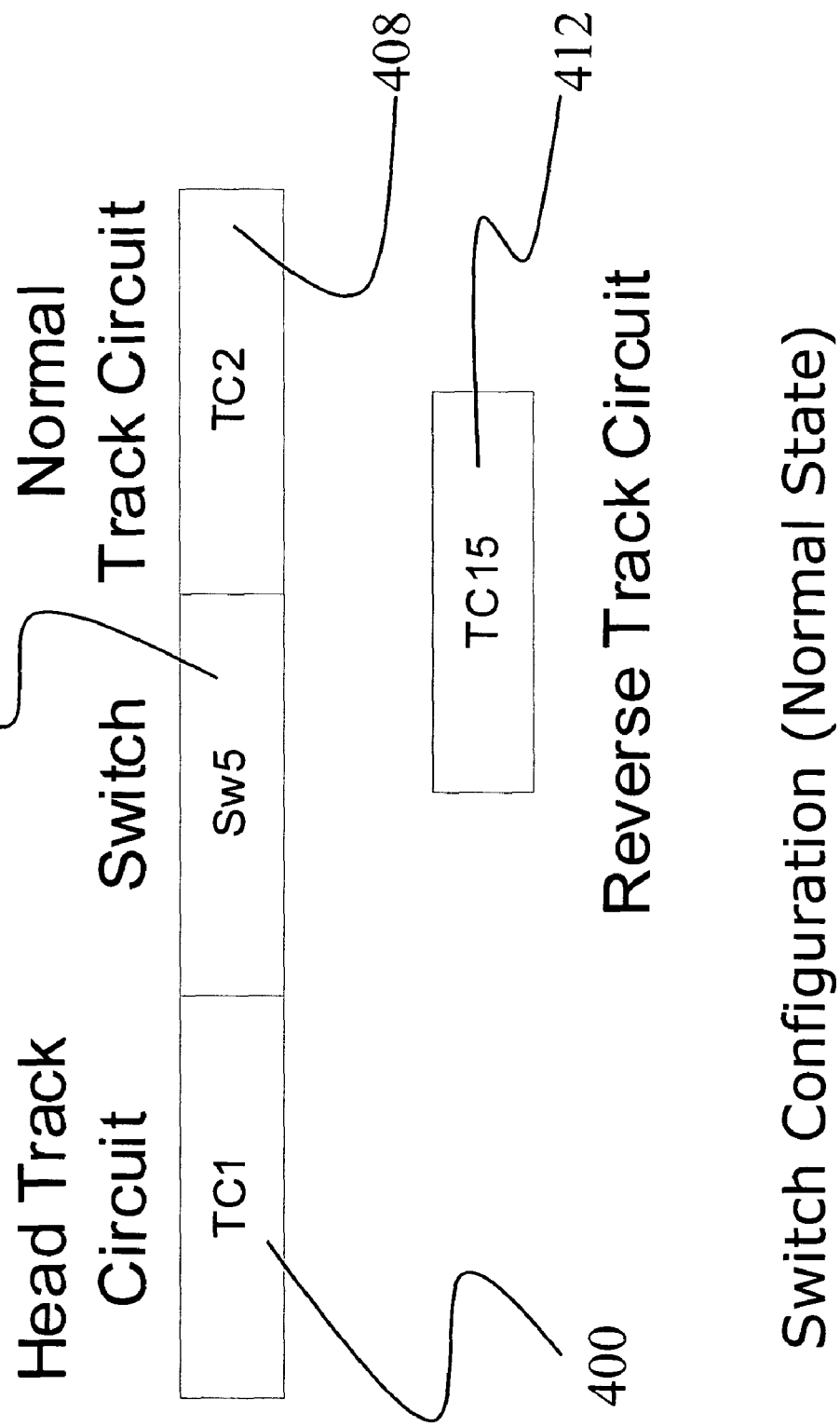
FIG. 4 is a database representation of a switch track circuit in normal.
Figure 5:
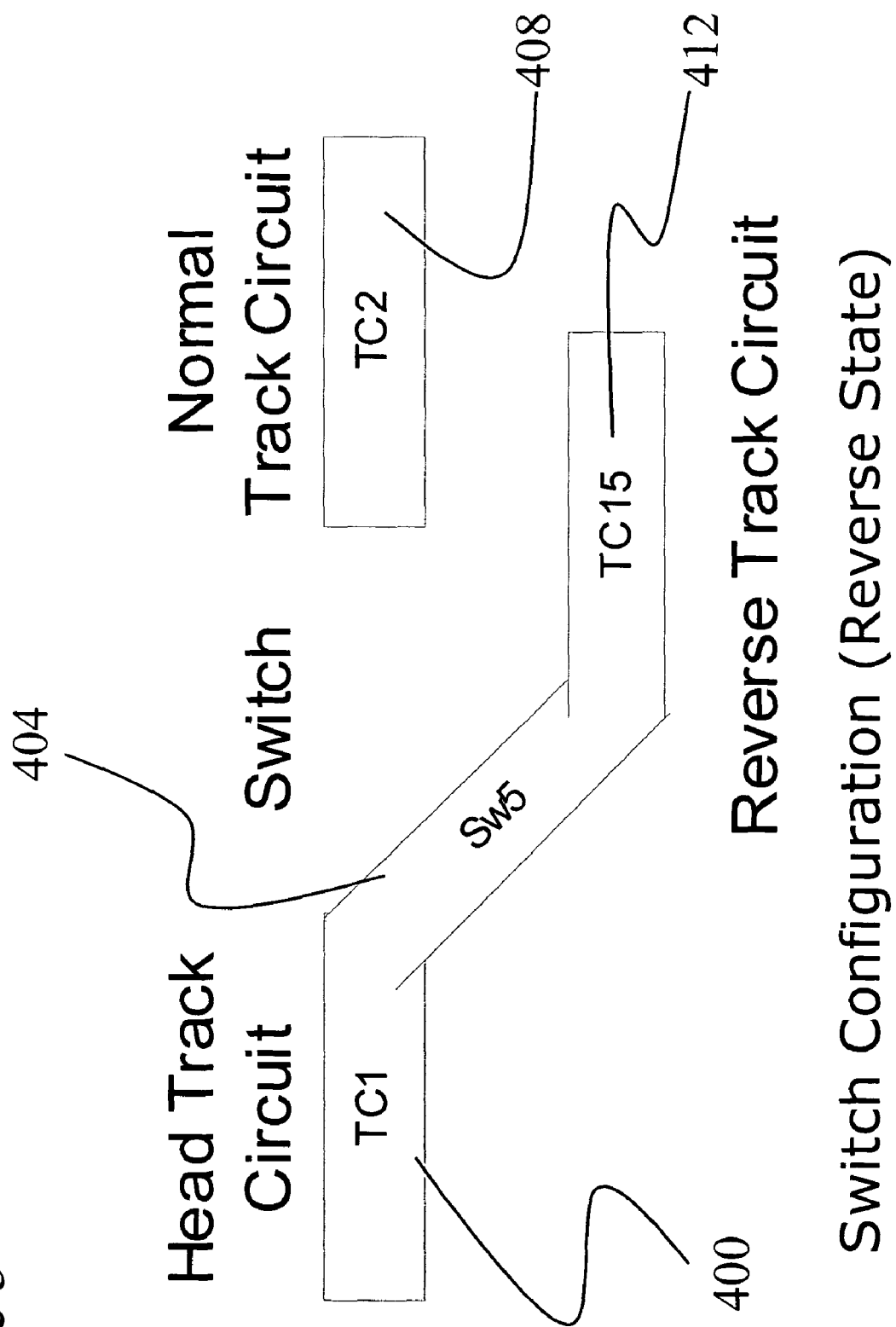
FIG. 5 is a database representation of a switch track circuit in reverse.

Switch or switch track segments allow a decision point in a rail system in which a train may select from more than one route. Switches provide great flexibility in track layout and functionality. In the database engine of the present invention, switches are often located at the junction between two track lines. To represent a switch in the database, the configuration is comprised of a switch ID, a location, the switch type, the head track circuit (located at the head of the switch), the normal track circuit (located at the normal position of the switch) and the reverse track circuit (located at the reverse position of the switch). FIGS. 4 and 5 depict switch track configurations.

FIG. 4 shows an exemplary representation of a switch (Sw5; 404) in the database of the present invention. When Sw5 404 is in its normal state, TC1 400 and TC2 408 are connected logically to one another. For traffic flow in the increasing direction from the left to the right, TC2 408 would be the Front TC of TC1 400 and TC1 400 would be the Rear TC of TC2 408.

FIG. 5 depicts the database representations of the logical connection of track circuits when switch Sw5 404 is in its reverse state. For traffic flow in the increasing direction to the right, TC15 412 would be the Front TC of TC1 400 and TC1 400 would be the Rear TC of TC15 412. The database would include both of these switching outcomes, and the real-time operation of the rail design (e.g., in simulation mode) would take the switching into account).

A switch may be configured as one of several types. For example, automatic switches are those that are controlled automatically. These switches may or may not be associated with a route. Alternatively, manual switches are not controlled automatically. They are only controlled by the user and must be set for specific train movement, as in through rail yards.

In addition to the rail layout, signaling and switches, rail system designers also design specific trains with specific characteristics to run on these rail layouts. Therefore, there are also several elements of train behavior that may be configured as part of the database engine of the present invention. Train configuration determines initial conditions and the behavior of trains under certain conditions with respect to their movement.

In the database, train configuration typically consists of a train ID, consist information (i.e., number of vehicles), cycle indicator (i.e., number of loops or iterations of a route), route information, train length and starting location. The starting location is a track circuit ID or other entry location defined in the track line configuration. In addition, the train's entire route list is included in its configuration. A route list consists of route IDs (a series of track and wayside objects) and scheduled arrival/departure times at stations or other locations along the route if the system is running in schedule mode.

A train's cycle indicator indicates the number of times a trip is executed during a simulation. After the determined number of iterations of trips is executed, the train exits the system from a pre-configured location on the system. This location is a predefined entry/exit point. After the last route is executed, the train is automatically routed to its exit location with no station stops.

In headway mode, a set of trains can be created. A name is indicated along with a consist size and vehicle configuration, the trip to execute, the entry time and number of loops. The number of trains to follow is entered by the user along with the headway time (time between trains).

Routes are also fully configurable in the present invention. In the database, route configuration consists of a route ID, each object in the route and the states of the objects. The listing of objects are placed in the order in which they appear, i.e., the order in which the approaching train would pass them when traversing the route.

Routes are generally configured such that trains can reference each route by a route ID. Route IDs are typically given a unique ID that is related to its signal and a track circuit on which the route ends. For example, an exemplary route format follows:

[Signal]_[Track Circuit].

The signal is the initial object in a route list. Any track segment, track circuits, switches or other wayside devices necessary to complete the route are included in the list of objects. The last object in a route is typically a track segment or tack circuit. Routes can be defined as starting from an approach signal (i.e., a distant marker), a home signal or any other signal within the system.

A trip (the next larger logical grouping of track and signaling features) is defined as a set of standard routes. A list of these routes is determined at setup time, but end users have the ability to add, modify or delete trips. Therefore, when a user configures a train, a trip set is selectable, and all routes in this trip populate the route fields. If the user wishes to change one or more routes for the train, those routes are selectable from other possible routes for modification for that train.

Typically, rail layouts also include a variety of different stations along the route at which passengers can get on and off the train. The present database engine allows for the easy input of station information. Station configuration in the database consists of a unique station ID, a location (i.e., platform track circuit), a platform door configuration, if they exist in that particular implementation (the operation of the doors at a station—important when doors exist on both sides of a train) and each platform's default dwell time (the length of time the train stops at a station).

Figure 6:
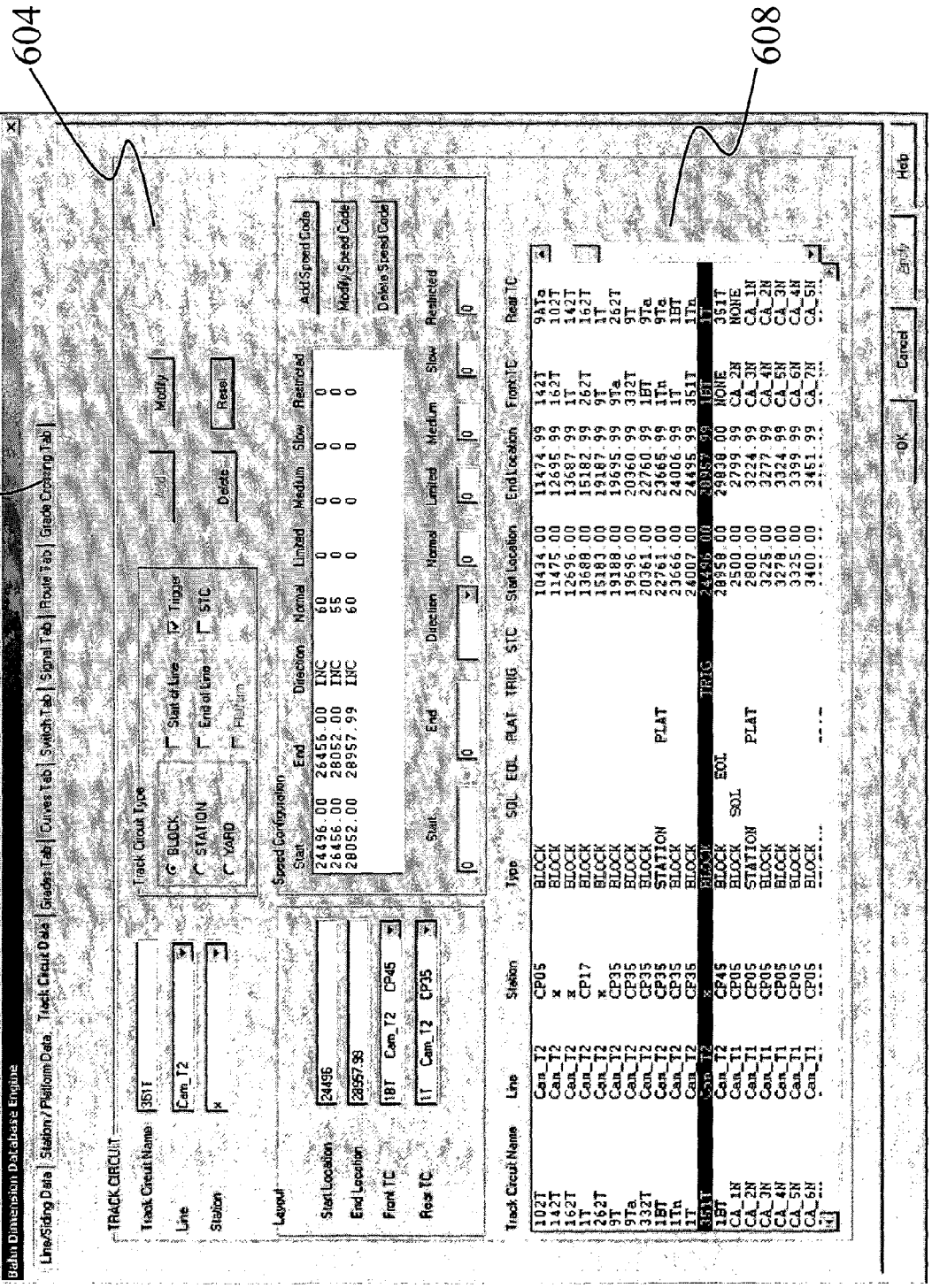
FIG. 6 shows an exemplary database engine data entry screen for track configuration data.

The above information details the major types of data that may be input into the database engine to describe a proposed rail system. In order to facilitate the input of all of this information related to track and train layout and characteristics, the database engine preferably includes a user-friendly interface. FIG. 6 shows one exemplary input/display screen 600 for entering, storing, and/or modifying track circuits within the present invention. The top window 604 of the database engine input/modification screen 600 of FIG. 6 includes the details of a selected track circuit, and the bottom window 608 shows a summary list of all of the currently entered track circuit.

As described above, each track circuit entry includes attributes such as a track circuit name, line, station and one or more track circuit types (e.g., block, station, yard, etc.). This information may all be entered into the system via entry blanks or selectable list data as depicted in FIG. 6. The track circuit information screen also preferably includes entry points for the track start and end locations as well as the front and rear TCs for the track circuit. There may also be various speed setting blocks for setting limits for various speed parameters for which a train must follow when travelling over the defined track circuit segment.

The lower portion 608 of the track circuit entry screen 600 of FIG. 6 details a list of all of the track circuits that are currently entered as part of a proposed rail system—in this case organized by track line number. In this window, a user may view and select various track circuits. Typically, all pertinent details about each of the track circuits are viewable in this window, such as: track circuit name, line number, position and speed data, etc. Selecting a track circuit segment in this lower window will move that track segment's information into the upper window.

A seen along the upper portion 604 of FIG. 6, additional database entry and modification screens may be easily accomplished through this general database entry screen. For example, selecting the "grade crossing tab" 612 presents the user with a screen such as that shown in FIG. 7.

Figure 7:
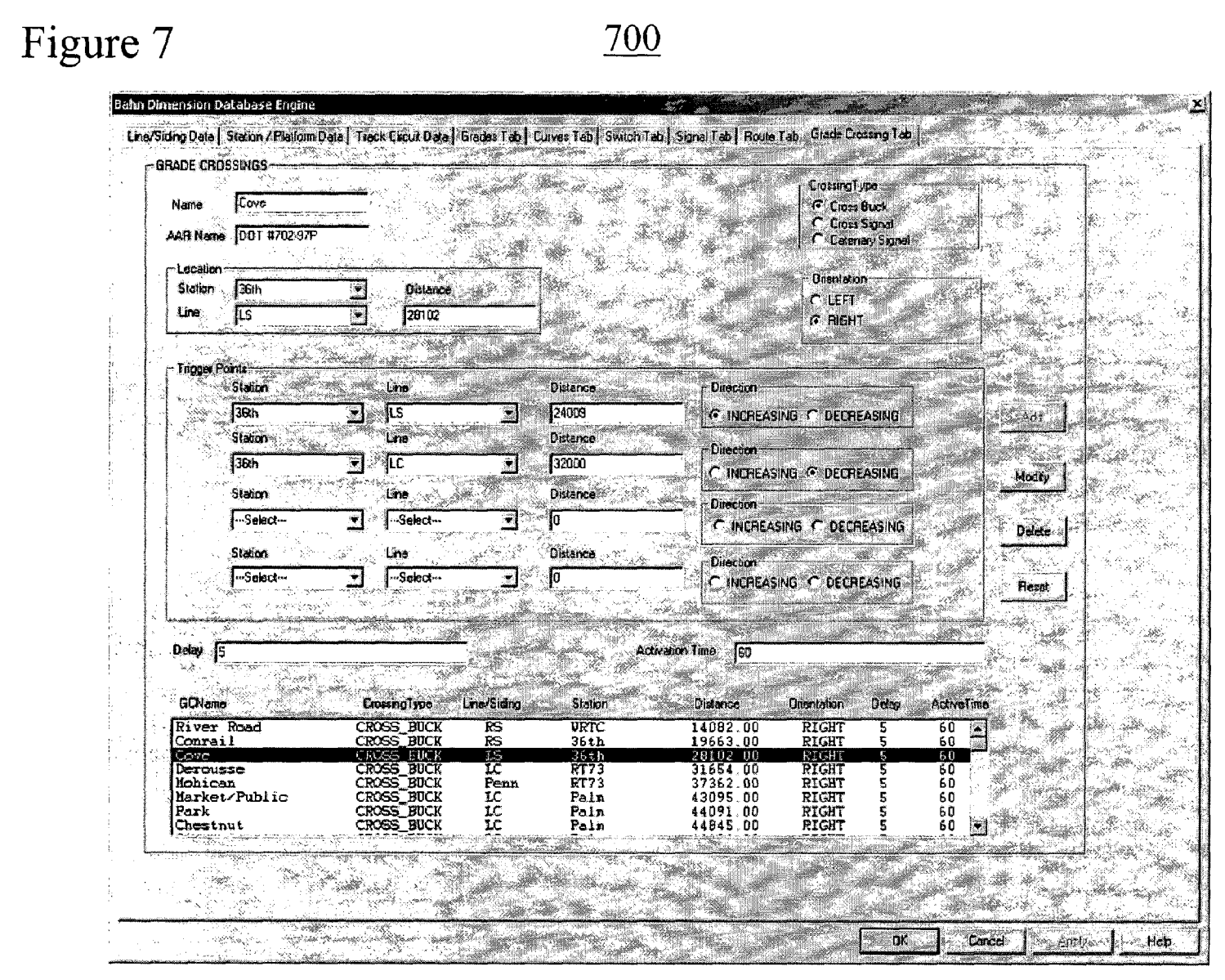

The grade crossing entry screen 700 of FIG. 7 allows for the entry and modification of grade crossing data which determines when grade crossings are activated. This information typically includes delay times, trigger points and distances, activation times, and location information related to each grade crossing.

Other database engine entry and modification screens may include: line/siding data; station/platform data; grades; curves; switches; signals; and routes. Each of these (and other) database entry screens is preferably designed to easily allow a user to input, modify and view the contents of the database engine in a logical manner. Each of the characteristics of a rail system layout described above (and others) may be included in these screens.

Simulation Engine

After utilizing the database engine to enter all of the track and train information, the simulation engine software program may be used to extend the functionality of the present invention. The simulation engine is responsible for creating and controlling the train simulation based on the stored data in the common database. The simulation engine is broken up into administration functions and transit functions. The administration functions control the overall status of the simulation engine, and the transit functions control the specifics of each particular simulation.

Administration functions are those functions that are executed offline and are external to a rail simulation execution. Trains are initialized according to their configured routes and times and enter the system accordingly. Upon simulation, a "view log" function provides the user with the ability to view all events that transpired from a given simulation run for analysis. From this single, user-friendly interface, the user can review and analyze data from any simulation.

Transit functions are those functions that provide the user with the ability to interact with the simulation system at runtime. Transit functions provide the user with options to modify how a simulation performs under specified conditions. Failures of trains or wayside devices can be interjected to determine the resulting effects on system performance, central office software or trainee response. This flexibility greatly reduces the number of simulation iterations that must be separately performed.

The system operates under two types of modes: schedule and headway. In schedule mode, all trains on the system are routed based on a specific schedule set up for each train. In headway mode, trains enter the system with a predetermined headway or entry time. They preferably follow their assigned routes during operation. Dwell times within each station are determined by each station platform's predefined dwell time stored in the database engine. After a train enters a station, it then departs when the station dwell time has expired.

The simulation engine provides runtime flexibility to the user. In schedule mode, should the user wish to modify a schedule parameter, the route and schedule for each train may be modified to change train operation. In headway mode, should the user wish to modify a headway parameter, only the route and headway times may be modified to change operation.

The simulation engine also preferably provides multiple configurable parameters related to train function during the simulation. Train functions provide an interface to the simulation whereby trains are manipulated during execution. For example, train movement, which occurs as a result of rules and parameters determined during configuration, may be changed by a user. "Absolute movement" would define train movement based on calculated locations. This mode of movement is preferably used primarily by communications-based train control simulations. "Block movement," on the other hand, defines train movement as being determined by track circuit occupancies.

During a simulation, trains enter the system based on the operation mode. If the system is in schedule mode, trains enter based on their entry time and location as determined by the stored values in the database. If the system is in headway mode, trains enter based on the headway time and location stored in the system. A train enters the system by occupying the first track circuit in its trip. Trains exit the system based on the operation mode also.

During a fixed-block simulation, a train is said to "occupy" a track circuit if any part of the train is positioned within the confines of the track circuit. This definition refers to the "block movement" of a train. A train is allowed to enter a track circuit if the circuit's protecting signal (described above) allows entry into the circuit. Therefore, a train may occupy multiple track circuits at a given moment. A train may not enter a track circuit if that circuit is protected by a stop signal, maintenance hold, route request or route locked condition by another train. Maintenance hold, route request and locked conditions are processed in a similar fashion as an occupied track.

In a fixed-block simulation, a train is said to "unoccupy" a track circuit (thereby opening up that track circuit to other trains) if a train exits the circuit (in block movement). Unlike track occupancy, there are no restrictions on unoccupancy if the train is capable of movement out of the circuit. A track circuit is set to "occupied" when a train enters its boundaries. A track circuit is set to "unoccupied" when a train exits its boundaries.

In a fixed-block simulation, a train is allowed to proceed to the next track circuit in its direction of travel (increasing or decreasing) if it receives a "proceed" aspect from the signal protecting the next track circuit. A proceed aspect allows a train to accelerate to the designated speed limit. Likewise, a train is allowed to proceed to the next track circuit in its direction of travel if it receives a "restricted" aspect from the signal protecting the next track circuit. A restricted aspect allows a train to accelerate or decelerate to the restricted speed limit.

Train movement during a simulation will be temporarily halted for a number of different reasons. For example, a train stops at a signal that presents a "stop" aspect. A train also stops at a station where the track circuit indicates a platform, if the train is scheduled to stop at that particular station.

As briefly described above, the simulation engine uses preconfigured routes to determine train movement around the system. Routes determine how a train enters and exits a station; however, a route maybe placed anywhere on the system.

Routes and train travel during simulation are affected by the use of switches in the track layout. There are two distinct types of switches: manual and automatic. Manual switches are those that typically lie within the confines of a yard. Automatic switches are those that are controlled by the simulation system for train movement purposes. When a switch moves, links between track circuits (as in the database engine) are modified accordingly. In other words, when a switch moves to its reverse position the adjacent track circuit to the one at the head of the switch becomes the track circuit adjacent to the reverse tail of the switch.

A train's movement through the rail system during simulation is influenced by many factors. A track circuit's route status is determined by train locations "occupied/unoccupied," route configuration and requests from routing. Possible routing states for a track circuit are "route request" and "route locked." A track circuit's occupancy state and route state may be superimposed, e.g. a track circuit may have simultaneous states of unoccupied and route locked.

When a train approaches its next designated route, it initiates a route request from a predefined trigger (usually a track circuit) followed by a delay. Each device in the route is set to a "route request" state and tested to insure that a "route locked" may take place. If all switches and track circuits within the route are available, i.e., no other route requests, route locks, maintenance holds or occupancies, then all track circuits in the route are set to "route locked." If any object is not available, then all devices remain in a state of "route request." When a train enters a track circuit which has a state of "route locked," the state goes occupied and "route clear." When a track circuit in the route goes unoccupied, the track circuit is free for the next route request.

Signaling functions associated with a proposed rail system are also user configurable via the simulation engine. Signal functions are generally limited to setting the signal's aspect (i.e., state of the signal). Manual signals are set interactively by users, and automatic signals are set in simulation and modeling. In dispatcher training mode, the user may change the aspect of any signal (except automatic block signals) as long as the automatic routing system of the application does not presently control the signal.

Generally, in order to change the aspect of a signal, the user must initiate a control command whereby the simulation system relinquishes control of the signal to the user. The user may return control of the signal to the simulation system at anytime. Users have the ability to set the aspects of manual signals, for example, using the graphics and simulation engine user interface. Only the simulation system has the ability to set signal aspects for any automatic signal.

In all modes, the user may change the aspect of any approach or home signal as long as the automatic routing system of the application does not presently control the signal. In order to change the aspect, the user must initiate a control command whereby the simulation system relinquishes control of the signal to the user. The user may return control of the signal to the simulation system at any time.

The simulation engine also allows for control of station functionality. For example, the dwell time for each station is configurable by the user during design time. In dispatcher training mode, the user may select any platform and modify its dwell time in run time—all while the simulation is progressing.

The simulation engine also allows the user to alter schedule functionality. As described above, each train requires a schedule (a series of routes and a departure time at each station) in order to perform a run. A predefined set of routes can be configured and named as a trip. The schedule is not modifiable at run time and must be loaded when a new simulation run is executed. A train's entire schedule consists of a trip (a series of routes), alternate routes, entry/exit locations and the number of trips to perform. A simulation is performed when one or more trains execute their schedules. This results in reports on train interaction, schedule times and wayside device behavior.

The simulation engine also allows for control of alarm functionality. Alarms are presented to the user from the simulation engine user interface in real time as the alarm conditions occur. Alarms may indicate train conflicts, departure delays and any deviation or problem that arises during execution. An alarm summary screen provides a view of the alarm list for the current simulation in real-time. The alarm summary displays all alarms in the order in which they occur.

Train conflicts are defined as occurrences where a train is prohibited from movement by another train's occupancy. The associated delay time is displayed on the alarm screen after the train receives a proceed indication from the signaling system. Train conflicts and delays are logged for future analysis.

Route conflicts are defined as occurrences where a train is prohibited from setting a route due to another train's occupancy, route request or route lock. The associated schedule conflict is indicated on the alarm screen. Route and schedule conflicts are logged for future analysis.

As with the database engine, the simulation engine software program also includes many data entry screens in which a user can enter data and modify settings all while the simulation is running. Data such as block speeds, station dwells, grade crossing and train parameters can be modified to enhance system performance.

Figure 8:
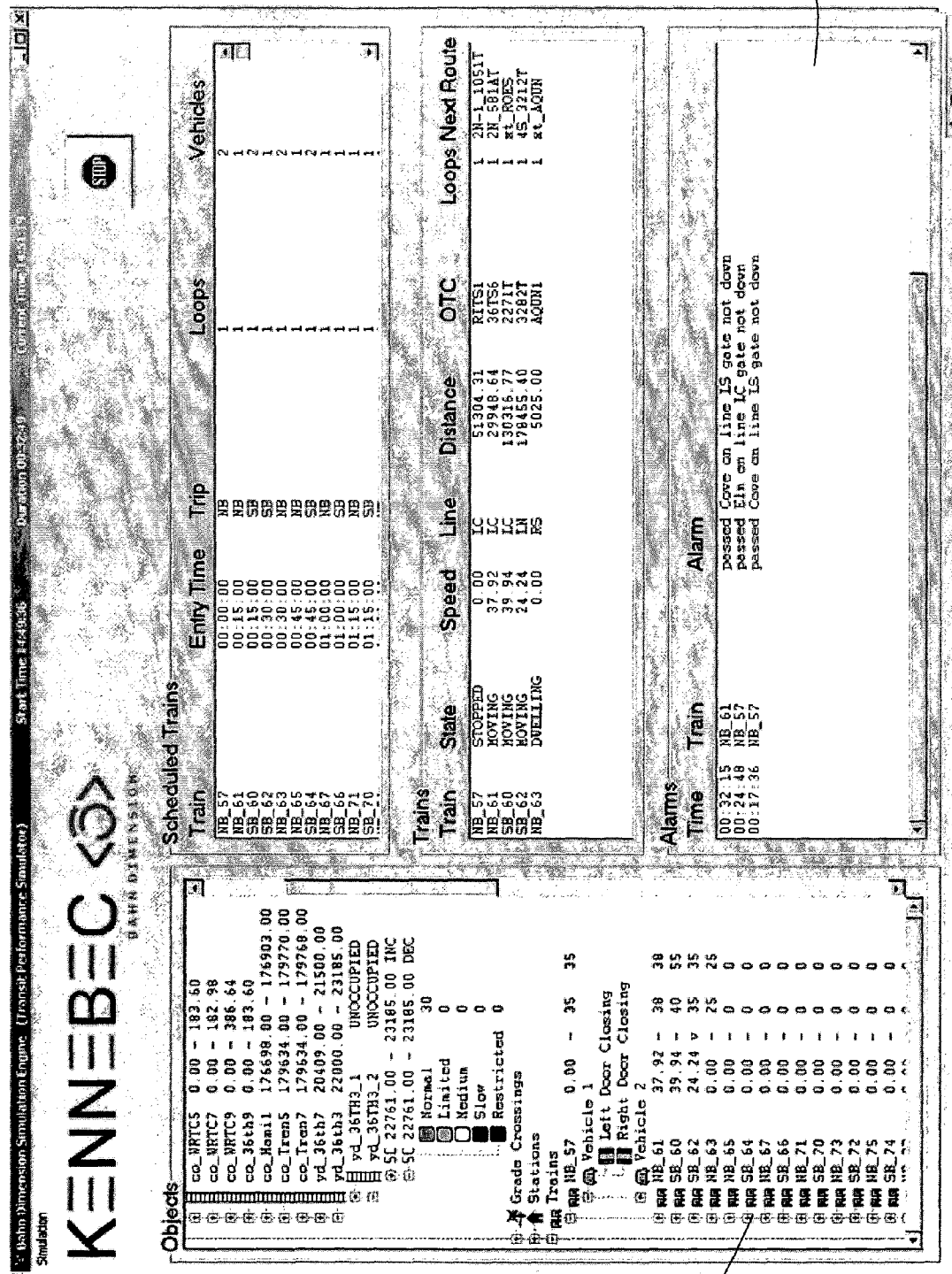
FIG. 8 shows an exemplary simulation engine real time data output screen.

For example, FIG. 8 depicts a real-time simulation engine user interface screen 800. This screen 800 displays such data as train speed, location (station and block occupancy), route and vehicle door states 804. Conditions that degrade a train's performance may be alarmed. In FIG. 8, the alarm conditions are shown in a lower window 808. The key to the simulation engine is its ability to run and simulate based on the information already present in the database engine described above, and with the flexibility of the user interface screens (of which FIG. 8 is one of many).

The simulation engine preferably also includes event logs as depicted in FIG. 9. These event logs describe all train movement and device states for further analysis. The data may be sorted by event, train or other indicator.

As seen in FIGS. 8 and 9, other simulation engine screens may include both real-time interaction as well as static reporting and simulation displays such as: grade crossing and switch information as well as track speed limits and station dwell time information.

To maximize the features of the present invention, the above-described text and list-based information from the simulation engine is preferably combined with a powerful, 3-dimensional graphics front end which creates system topography entirely from the database information, in real-time while the simulation is running. Therefore, the user has the option of viewing either or both of the 3-D front end and the tabular simulation information. Additional custom objects (not in tabular simulation) such as buildings, trees, roads, wayside devices, signs and other landmarks can be included in the visual representation of the simulation for a realistic experience. Likewise, vehicles, station platforms, station signs, signal heads and grade crossings can be customized and added to meet any design requirements.

The 3-D graphics engine includes multiple different "camera" angles such as: an overview; cab view (useful to detect operator line-of-sight problems that might not otherwise be detected through conventional simulators); birds-eye view; floating view; and a mode that allows the user to follow a selected train. Signal aspect, switch movement, train movement and grade crossings are displayed in real-time. The basic features and functionality of the graphic engine is set forth below.

Graphics Engine

The graphics engine is communicatively connected to the database engine and the simulation engine and is responsible for creating a virtual world out of the symbolic and tabular information from these sources. The graphics engine "builds" the track layout entirely from the database—a change to the database is automatically seen in the simulation and graphics engines. The visual layout includes all wayside devices such as switches, signals, stations, platforms, and track circuits, as well as trains and other vehicles. Any of the automatically placed objects can be moved and rotated manually and saved as a modified graphics layout.

There are preferably two modes of the graphics engine: (1) design mode; (2) runtime mode. The design mode is the mode whereby objects can be added, loaded and manipulated as described in the sections below. The runtime mode is the actual operation of the graphics engine.

In design mode, the user has the ability to add custom or preexisting objects to a simulation. These objects may include bridges, streets, vegetation and buildings—anything to make simulation more realistic and/or accurate. In addition, the user has the ability to modify terrain with drag and drop mouse capabilities—for ease of editing.

Objects used by the graphics engine may also be loaded directly from the graphics engine database. These types of objects include track, switches, signals and station platforms. When placing objects, the graphics engine defines each object by object location, object type, and by a unique object ID.

To reduce time, it is only necessary to load objects from the database once. If an object is added or modified in the database, an update shall be sent to the graphics engine. Other objects, i.e., their IDs, locations and orientations, already existing on a screen in design mode, shall not be amended when an update of another object occurs. The graphics engine retains a list of all objects that have been received for the graphics engine database and then compares this list with the list of objects sent to it to determine which objects are new. Any new objects are added to the screen.

The runtime mode of the graphics engine is the mode whereby the states of objects are controlled by messages received from the simulation engine. The user does not have the ability to modify object attributes or locations from the runtime application. Preferably only object states (e.g., signal aspects) may be modified at run time.

A user initiates a new simulation execution from the interface screen on the simulation engine. When a new simulation is initiated, the simulation engine sends a command to the graphics engine to load all graphics according to the design locations, states and orientations. This begins the 3-dimensional visual rendering.

Once a simulation has been initiated, the graphics engine continually updates all object states, including train movement, switch state and signal state, based on real-time messages sent by the simulation engine as the simulation progresses. A user may stop the simulation at any time from a command located on the simulation engine interface screen. When the stop command is received, the simulation engines signals the graphics engine, and the graphics application executes a shut down sequence that limits errors or operating system exceptions.

To facilitate the communication, the graphics engine is preferably connected with the database engine through a high speed network connection. The graphics engine preferably receives data from the simulation engine via TCP/IP connection using UDP protocol. The network parameters that connect the graphics engine to the simulation engine are also configurable by a user.

As briefly described above, the graphics engine preferably allows for multiple different camera views and angles in order to better model the trains of the present invention. The user can move the camera from side to side and forward and reverse (as if viewing from an airplane). These functions may be invoked and operated by simple mouse or keyboard commands.

The camera system of the present invention preferably also includes additional camera and movement functionality, such as; rotate view; move to object; follow train; and zoom. The rotate view function rotates the camera in a clockwise or counterclockwise direction. The move to object functionality provides the user with the ability to move directly to an object by selecting the object from a list of possible objects within the entire graphics scenario. The follow train functionality provides the user with the ability to follow a selected train as it traverses the system. The angle of the camera does not change (unless the user changes the angle by rotation) in "follow train" mode. The zoom feature provides the user with the ability to zoom to and view from any location on the system, including the interior of a vehicle, a station platform, at the wayside, from a building or from a grade crossing.

The communications system of the present invention provides a multitude of communication functions and message transfer functionality. For example, during the course of the simulation in runtime mode, train position shall be constantly updated. At a predefined time or interval, a message with the new train position is sent from the simulation engine to the graphics engine.

Additional messages can be sent from the simulation engine to the graphics engine for a variety of different tasks. For example, each station may display a sign indicating if a train is approaching or departing. The simulation engine will send a message to the graphics engine indicating what message to display on these station signs.

Switch state updates are also sent between the engines when a switch is set to move to a normal or reverse state. While the switch is moving, the state shall be set to "out of correspondence." A switch is shown to be in normal or reverse state by making the turnout track circuit move to the correct position. The timing of switch movement from one position to another shall be a configurable parameter.

The graphics engine also graphically represents the state of each track circuit during simulation mode. As discussed above, the track circuit state is generally defined by one or more of the following states: occupied; unoccupied; route request; route locked; and maintenance hold. During simulation, the various track states are represented by a different color. For example, one intuitive color scheme is as follows: occupied=red; unoccupied=gray; route request=yellow; route locked=green; maintenance hold=black. In this way, as the train moves along the track, the track color visually indicates the state of the track. In addition, the user may turn on or off the color representation in the graphics if desired.

Report Engine

Either embedded into the functionality of one of the above-described software engines, or as a standalone piece of software, performance and event log reports are created based on simulation run data. This functionality is referred to as the report engine, and the generated reports detailing performance and schedule analysis are typically available to the user offline. A typical performance report may display train dwell times, delays, fuel or power consumption and other performance-related issues. Similarly, an event log report, displaying all events that occur during simulation execution, may also be created for the user.

A schedule is created from real-time data itemizing the arrival and departure times for each train at each station. Passenger flow is calculated based on real-time data using the arrival and departure times for selected stations. The capacity of vehicles and the size of each consist are also configurable and may be used in calculating passenger flow. Passenger flow is defined by how many passengers can be moved in one hour. User-selectable parameters include the starting and ending platform for which passenger flow should be calculated and the capacity and number of each vehicle.

One exemplary performance report is shown in FIG. 10. The reports engine has wide-ranging functionality including the ability to generate reports detailing the performance, alarms, passenger flow, train scheduling and others.

Central Office Systems

Each rail system in use is communicatively connected to a central office which controls all aspects of the rail system. In essence, a rail central office is akin to an air traffic control tower for airplanes. All information related to every facet of the rail layout is sent to the central office for processing, and the central office then controls the layout (e.g., switches and signaling) based on this processing. In typical practice, the design of the central office takes place after the physical field site (the rail layout) is installed. In contrast, the present invention provides for the design, development and testing of a central office system prior to actual implementation.

The present invention may be used to simulate a central office in the design and testing stages of a rail system. In this way, central office development, testing and the like could occur at the same time as the physical field site is being developed. Because the present invention can be used to create a "virtual" field site, this virtual field site may be used to construct and test a central office to operate the physical field site after construction. The present system is preferably designed to connect to and employ standard operational components from a wide variety of vendors. The present system preferably includes a converter that allows the present system to receive input from and communicate output to the commonly-used operational components.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A computer system for designing transit systems, comprising:
  a database engine adapted to store data related to a proposed transit system design including track segment data, transit vehicle data, and topographical environment data;
  a simulation engine adapted to process said data related to a proposed transit system design into a simulation of said transit system design in use; and
  a 3-dimensional graphics engine adapted to process said data related to said proposed transit system design into a visual rendering of said simulation in real-time with said simulation which graphically displays a 3-dimensional visual rendering of said track segment, transit vehicle and topographical environment, wherein said database engine, said simulation engine, and said 3-dimensional graphics engine are all operably connected to each other.

2. The computer system of claim 1, further comprising:
a reports engine adapted to process and report results from said simulation and provide the results to a user in real-time, wherein said reports engine is operably connected to said database engine.

3. The computer system of claim 1, wherein said simulation engine further includes alarming functionality adapted to alert a user to predefined warning conditions as these conditions occur during said simulation.

4. The computer system of claim 1, wherein said database engine, said simulation engine and said 3-dimensional graphics engine are directly connected to each other as part of a single computer.

5. The computer system of claim 1, wherein said database engine, said simulation engine and said 3-dimensional graphics engine are connected to each other through a network connection.

6. The computer system of claim 1, wherein said stored data in the database engine includes user-definable data about signaling attributes of the proposed transit system.

7. The computer system of claim 1, wherein said track segment data includes, for each segment of track in the proposed transit system design, a unique track segment ID, a starting civil location, an ending civil location, at least one track type, and a track line ID defining a track line to which each track segment belongs.

8. The computer system of claim 1, wherein said track type is selected from the group consisting of: block, station, platform, switch, and route trigger.

9. The computer system of claim 7, wherein said stored data in the database engine includes transit configuration data related to a vehicle for traveling over said proposed transit system design.

10. The computer system of claim 9, wherein said simulation engine defines the travel of said vehicle over said proposed transit system with reference to the starting and ending civil locations of adjacent track segments.

11. The computer system of claim 1, wherein said proposed transit system is selected from the group consisting of light rail, heavy rail, automatic people mover, and bus.

12. The computer system of claim 1, wherein said simulation engine is adapted to perform performance calculations for the proposed transit system during simulation.

13. The computer system of claim 12, wherein said performance calculations include the numbers of passengers moved per hour.

14. The computer system of claim 1, further comprising:
a central office switch interface, wherein said central office switch interface manages an interaction between said database engine, said simulation engine and said 3-dimensional graphics engine.

15. The computer system of claim 1, wherein said simulation engine is adapted to provide a training simulator for maintenance and signaling personnel.

16. The computer system of claim 14, wherein said simulation engine is adapted to provide a training simulator for a central office dispatcher.

17. The computer system of claim 1, wherein said 3-dimensional graphics engine produces accurate, three dimensional simulation content.

18. A method of simulating a transit system, comprising the steps of:
creating a topography environment of a transit system;
generating representations of transit vehicles;
establishing a route of transportation for said transit vehicles with respect to said topography; and
graphically displaying said transit vehicles and said topography environment in three dimensions, wherein said three-dimensional display shows a pictorial view of said transit vehicles and topography environment as they actually appear.

19. The method of claim 18, wherein said topography is a track circuit.

20. The method of claim 18, wherein said transit system is selected from the group consisting of light rail, heavy rail, automatic people mover, and bus.

* * * * *